(12) United States Patent
Bridges et al.

(10) Patent No.: US 12,513,095 B1
(45) Date of Patent: Dec. 30, 2025

(54) SYSTEMS AND METHODS FOR NETWORK-AS-A-PLATFORM

(71) Applicant: CABLE TELEVISION LABORATORIES, INC., Louisville, CO (US)

(72) Inventors: Mark Bridges, Brooks, GA (US); Paul Fonte, Arvada, CO (US); Belal Hamzeh, Westminster, CO (US); Sanjay Patel, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 65 days.

(21) Appl. No.: 18/378,584

(22) Filed: Oct. 10, 2023

Related U.S. Application Data

(60) Provisional application No. 63/396,885, filed on Aug. 10, 2022, provisional application No. 63/440,203, filed on Jan. 20, 2023.

(51) Int. Cl.
*G06F 15/173* (2006.01)
*H04L 41/5009* (2022.01)
*H04L 43/0829* (2022.01)
*H04L 43/087* (2022.01)
*H04L 47/70* (2022.01)

(52) U.S. Cl.
CPC ........ *H04L 47/822* (2013.01); *H04L 41/5009* (2013.01); *H04L 43/0829* (2013.01); *H04L 43/087* (2013.01)

(58) Field of Classification Search
CPC ............... H04L 47/822; H04L 41/5009; H04L 43/0829; H04L 43/087
See application file for complete search history.

(56) References Cited

U.S. PATENT DOCUMENTS

| 11,611,436 | B2 * | 3/2023 | Ziegler | H04L 67/02 |
| 2018/0219749 | A1 * | 8/2018 | Bugenhagen | H04L 47/803 |
| 2019/0132197 | A1 * | 5/2019 | Saxena | H04L 41/0803 |

* cited by examiner

*Primary Examiner* — John B Walsh

(57) ABSTRACT

A network-as-a-platform (NaaP) ecosystem includes a network exposure layer (NEL). The NEL includes a plurality of federated application programming interfaces (APIs) having at least a first federated API and a second federated API different from the first federated API. The NaaP ecosystem further includes a first network in operable communication with the NaaP ecosystem through the first federated API of the NEL, and a second network, different from the first network, in operable communication with the NaaP ecosystem through the second federated API of the NEL. The NEL enables the second network access to at least one capability of the first network.

19 Claims, 7 Drawing Sheets

SYSTEMS AND METHODS FOR NETWORK-AS-A-PLATFORM

RELATED APPLICATIONS

This application claims the benefit of and priority to U.S. Provisional Patent Application Ser. No. 63/396,885, filed Aug. 10, 2022, and to U.S. Provisional Application No. 63/440,203, filed Jan. 20, 2023. The disclosures of both of these applications are incorporated herein by reference in their entireties.

BACKGROUND

Recent developments in Software Defined Networking (SDN) and Dynamic SDN (DSDN) have provided network level functionality and security protections for a number of different types of devices, particularly with respect to connected Internet of Things (IoT) devices, as well as other systems and apparatuses of both wired and or wirelessly interconnected devices. For some devices, DSDN techniques have been recently provided to dynamically implement virtual private network (VPN) tunneling capabilities, which add both strong security protections for connecting devices and networks, but also enable improved functionality for micronetworking implementations. Relevant VPN tunneling and micronet functionality is described in greater detail in co-pending U.S. application Ser. No. 18/123,814, filed Mar. 20, 2023, the subject matter thereof which is incorporated by reference herein in its entirety.

At present, conventional networking systems utilize a number of different application programming interfaces (APIs) for the respective networks, where such known APIs function according to the respective standards body/bodies (e.g., TeleManagement Forum (TMF), Third Generation Partnership Project (3GPP), Broadband Forum (BBF), etc.) defining the respective APIs. Accordingly, there is a desire in the industry for network and program application convergence to better enable easy communication between these various disparate networks.

Additionally, there is a further desire in the industry to enable the delivery of differentiated business-class services (e.g., corporate-level networks) for remote connectivity, such as in the case of work-from-home (WFH) scenarios. At present, many employees now utilize connective business equipment (corporate computers, smartphones, IoT accessories) outside of the confines of the office environment that typically includes significantly higher network security than is available to the average home network environment. Furthermore, where employees connect their corporate devices remotely, significant interaction is usually required by the user, or their information technology (IT) support staff, to set up the device and/or applications on the device. Therefore, there is a particular need to enable secure, automatic device/application setup without further user interaction.

These particular challenges and industry needs are addressed and solved according to the following embodiments.

SUMMARY

In an embodiment, a network-as-a-platform (NaaP) ecosystem includes a network exposure layer (NEL). The NEL includes a plurality of federated application programming interfaces (APIs) having at least a first federated API and a second federated API different from the first federated API. The NaaP ecosystem further includes a first network in operable communication with the NaaP ecosystem through the first federated API of the NEL, and a second network, different from the first network, in operable communication with the NaaP ecosystem through the second federated API of the NEL. The NEL enables the second network access to at least one capability of the first network.

In an embodiment, a central controller for a network-as-a-platform (NaaP)-based electronic communication ecosystem includes a network exposure layer (NEL). The NEL includes a plurality of federated application programming interfaces (APIs) including at least a first federated API and a second federated API different from the first federated API. The central controller further includes a processor and a memory in communication with the processor and the NEL. The memory is configured to store computer-executable instructions therein, which, when executed by the processor, cause the processor to subscribe a first network to the NEL through the first federated API, enable a second network, different from and separately operated from the first network, to subscribe to the NEL through the second federated API, and deploy an application originating from the second network to run on the first network based on at least one performance characteristic of the first network visible to the second network through the NEL.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
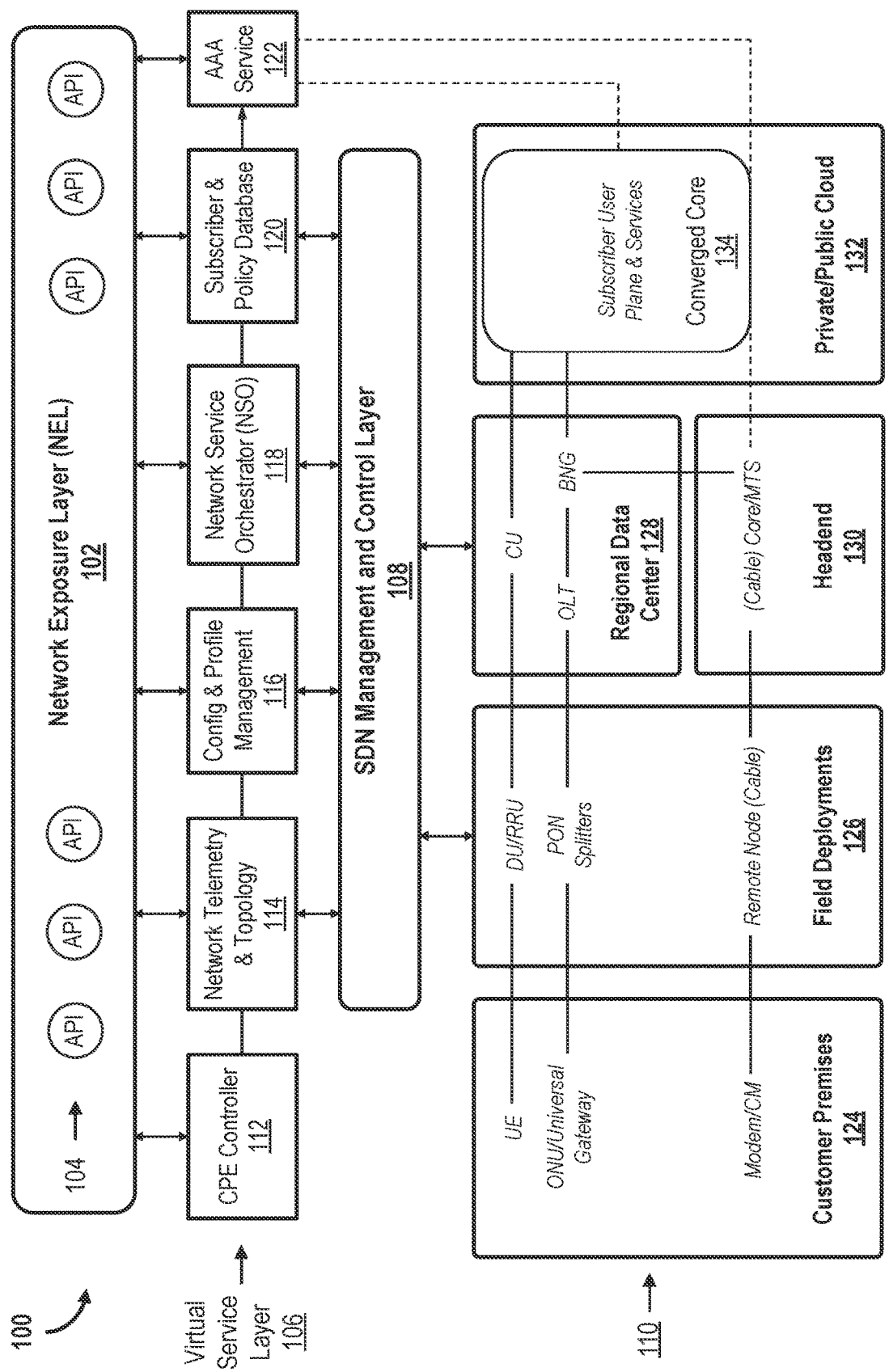
FIG. 1 is a schematic illustration of an exemplary network-as-a-platform logical architecture, in an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the times of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

As used herein, the term "data center" generally refers to a facility or dedicated physical location used for housing electronic equipment and/or computer systems and associated components, e.g., for communications, data storage, etc. A data center may include numer-ous redundant or backup components within the infrastructure thereof to provide power, com-munication, control, and/or security to the multiple components and/or subsystems contained therein. A physical data center may be located within a single housing facility, or may be dis-tributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thou-sands of physical servers connected by a high-speed network.

As used herein, the term "hyperscale" refers to a computing environment or in-frastructure including multiple computing nodes, and having the capability to scale appropriate-ly as increased demand is added to the system, i.e., seamlessly provision infrastructure compo-nents and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of compute and/or stor-age devices.

The present embodiments utilize Network-as-a-Platform (NaaP) architectures and Software Defined Networking (SDN) to provide an innovative Network Exposure Layer (NEL) that includes a set of distributed, but federated, application programming interfaces (APIs). That is, the APIs may operate from separate servers or locations throughout a networking ecosystem, but are coordinated to work together to enable various operators, users, and/or applications of separate networks or systems to utilize resources and/or services (e.g., speed boost, ultra low latency (ULL), bandwidth, CPE management, WFH capability, guest Wi-Fi services, etc.) from other networks or systems. In an exemplary embodiment, the NEL advantageously functions as a federated API gateway to enable devices or applications operating within one network to look across multiple other networks as a virtual menu of service and/or resource options.

Conventional communication ecosystems include various APIs that are exposed to only one network, but not to others. Users of such other networks are thus unable to access the services of the one network through that network's exclusive API. The present systems and methods overcome this challenge by federating multiple different network APIs into a single coordinated NEL. The NEL therefore further serves as a virtual "catalogue" of available returns from the multiple networks in response to a call from the first network. In some embodiments, the NaaP and the NEL may be in communication with a central processor that includes intelligence, protocols, and/or other security features governing the NEL and the NaaP. In an exemplary embodiment, the NEL enables the NaaP to provide different returns for the same call from different respective applications, operators, and/or users of the various multiple networks accessing the NEL.

According to the embodiments herein, the innovative NaaP and NEL effectively provide one network varying vision into other networks as to the capabilities that the other networks may provide to users or customers of the first one network. Such other-network services may then be advantageously provided to the customer of the first network in a seamless manner. That is, the customer may realize such additional other-network services without the need for that customer to directly interact with the other networks. In this manner, a user of an application from a single network (e.g., a social media provider) may execute the application (e.g., a virtual reality service) at various different levels of capability (e.g., bandwidth, speed, traffic priority, etc.) provided by different networks (e.g., MNOs, MSOs, access networks, etc.) through the NaaP/NEL.

The systems and methods described herein may utilize SDN or Dynamic SDN (DSDN) to provide both network-level and device-level security protections for a wide array of devices and systems, including but not limited to Internet of Things (IoT) devices, mobile devices, computers, routers, extenders, etc. Implementation of SDN/DSDN further enables the present embodiments to advantageously (a) quarantine or isolate devices that are infected with malicious software, such as malware or botnet software, or for which security patches are no longer available, and/or (b) control the network traffic of a device, for example, limited to (i) approved network or subnetwork destination points, (ii) approved network traffic types and/or traffic flows, and/or (iii) a cap to the amount of data flow to or from the device for a pre-determined period. In some cases, and particularly for devices having strong security, DSDN may be utilized to create VPN tunnels to add a layer of protection to both the device, and to devices connected to that device. Using DSDN, the present systems and methods may be further enabled to create layers of protection for devices by configuring dynamic VPNs to stop malicious traffic from connecting to DSDN system protected devices.

FIG. 1 is a schematic illustration of an exemplary NaaP logical architecture 100. In the exemplary embodiment depicted in FIG. 1, architecture 100 includes an NEL 102, which includes a set (i.e., a plurality) of distributed and federated APIs 104. In an exemplary embodiment, one or more of APIs 104 are standardized to be universally accessible to all networks accessing that particular API 104. Architecture 100 may further include one or more of a virtual service layer 106, an SDN management and control layer 108, and a physical infrastructure 110.

In an embodiment, virtual service layer 106 may, for example, include one or more services for interfacing with the various APIs 104 in the NEL, including but not limited to a CPE control service 112, a network telemetry and topology service 114, a configuration and profile management service 116, a network service orchestrator (NSO) 118, a subscriber and policy database 120, and an AAA service 122. Physical infrastructure may include, without limitation, one or more of customer premises equipment (CPE) 124 (e.g., UE, ONU, universal gateway, modem or CM. etc.), field deployments 126 (e.g., distributed unit (DU), remote radio unit (RRU), PON splitter, remote node, etc.), a regional data center 128 (e.g., central unit (CU), OLT, broadband network gateway (BNG), etc.), a headend 130 (e.g., core, MTS or CMTS, etc.), and a private or public cloud network 132 including a converged core 134 (e.g., subscriber user plane and services, etc.).

In some embodiments, one or more of virtual service layer 106, SDN management and control layer 108, and physical infrastructure 110 may include hardware and/or software of conventional network communication systems. In an exemplary embodiment, various components of layer 106, layer 108, and infrastructure 110 are logically coordinated through operable communication with one or more APIs 104 of federated NEL 102, thereby forming NaaP logical architecture 100 by subscription of the various networks thereof to the NEL.

The NaaP therefore represents an innovative solution to a long-felt need in the industry for program application convergence. According to the present embodiments, the NaaP plays a key role to meet this need by enabling a variety of separate networks to effectively communicate with one another through central logical architecture 100. Because NEL 102 may be both virtual and distributed, individual networks may utilize the advanced capabilities provided by the NaaP without the need for significant hardware or software modifications. In an exemplary embodiment, NEL 102 provides an innovative abstraction layer to the multiple networks in communication therewith, which abstraction layer then enables a common set of APIs (e.g., APIs 104) to make data calls. In some embodiments, such APIs 104 may be leveraged, for example, by one or more of internal operations, third party developers, and/or hyperscalers, etc.

In an exemplary embodiment, NEL 102 may be advantageously configured to catalog a plurality of existing APIs used for and within the paradigm of various different standard bodies (e.g., TMF, 3GPP, BBF, etc.) to form a federated set of APIs to form a baseline for a network subscribed to the distributed NaaP. Several exemplary use cases, which leverage this advantageous baseline NEL platform, are described further below with respect to FIGS. 3-5. An exemplary NaaP architectural distribution is described below with respect to FIG. 2.

Figure 2:
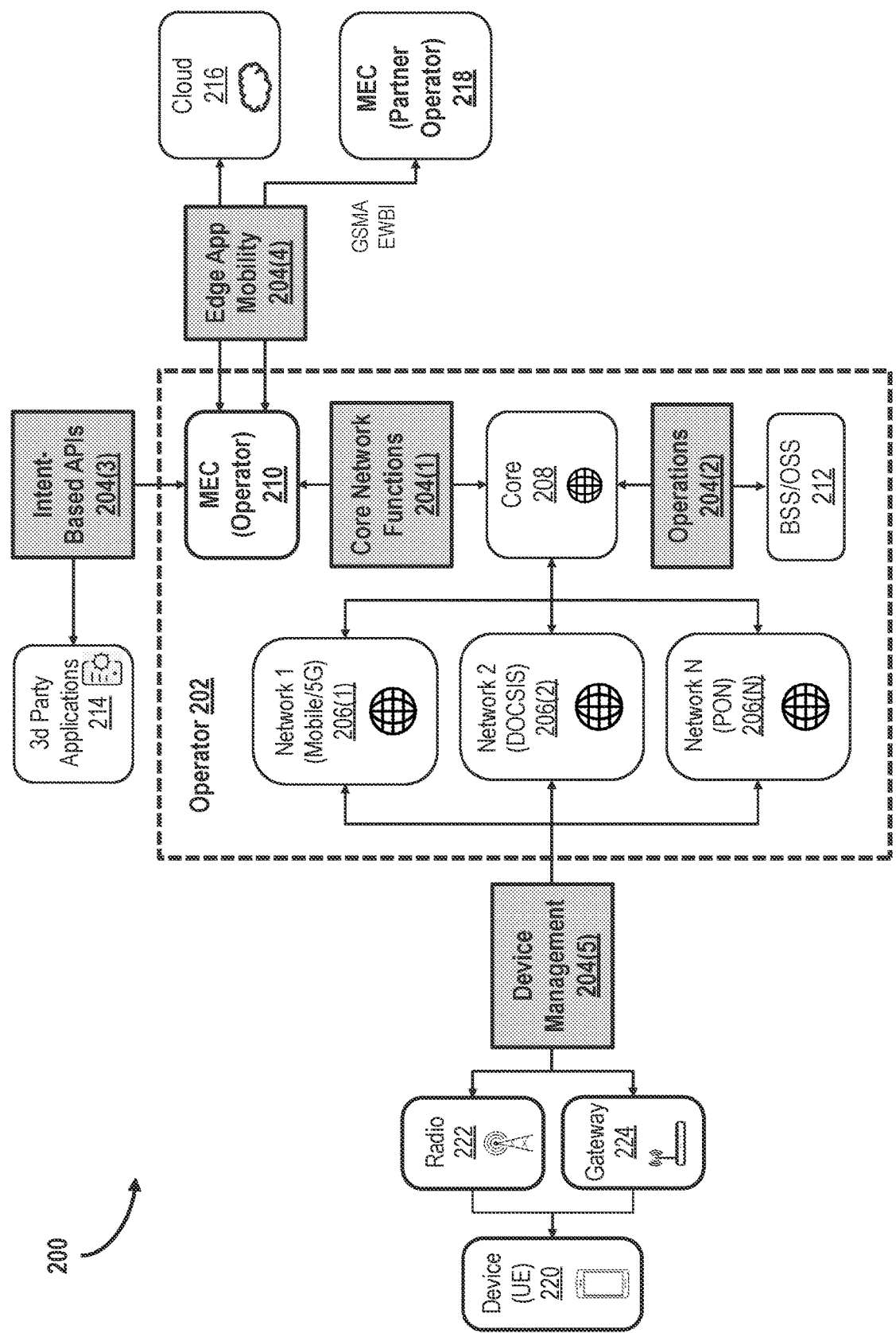
FIG. 2 is a schematic illustration of an exemplary network-as-a-platform architecture, in an embodiment.

FIG. 2 is a schematic illustration of an exemplary NaaP architecture 200. In the exemplary embodiment depicted in FIG. 2, NaaP architecture 200 is illustrated from a perspective of a network operator 202 utilizing a NEL having a plurality of federated APIs 204. In an exemplary embodiment, network operator 202 may manage one or more (i.e., 1–N) subscribing networks 206 (e.g., mobile, 3GPP-related, 5G, DOCSIS, PON, access, low earth orbit (LEO), very LEO (VLEO), etc.) in operable communication with a core 208 (e.g., converged, separate dedicated cores, and/or a combination thereof, capable of supporting the several networks 206), as well as a first Multi-access Edge Compute (MEC) site 210 and/or a business support system/operations support system (BSS/OSS) 212. In this example, within the domain of network operator 202, core 208 is configured to interact with first MEC site 210 through a first API 204(1) (e.g., core network functions, such as GSMA SBI-NR/3GPP NEF, etc.), and with BSS/OSS 212 through a second API 204(2) (e.g., operations, such as TMF 633, 634, 638, 639, 640, 641, 651, 666, etc.).

First MEC site 210 may then be further configured to externally interact with third-party application 214 through a third API 204(3) (e.g., intent-based APIs, such as CAMARA Project, etc.), and with one or both of a Cloud network/system 216 and a second MEC site 218 (e.g., of a partner operator) through a fourth API 204(4) (e.g., edge application mobility, such as MEC-AMS, EDGE App, etc.). In an embodiment, one or more of subscribing networks 206 may operatively communicate with one or more wireless communication devices 220 (e.g., a UE) through a fifth API 204(5) (e.g., device management, such as SNMP, TR069, TR369-USP, etc.) of the NEL interacting with a radio access point (AP) 222 (e.g., for 3GPP cellular communications, CBRS, IEEE 802.11ah (Wi-Fi HaLow), LEO, VLEO, GEO, etc.) or a gateway 224 (e.g., Wi-Fi AP, Ethernet connection, ONU, modem, etc.) connected with device 220.

According to the present embodiments, the NaaP/NEL may be further leveraged for future APIs and endpoints that are not currently in existence. The present embodiments are therefore advantageously adaptable for new networking solutions that seek to integrate with, and/or utilize the resources of, existing networks and APIs. In this manner, the present NaaP/NEL solutions that enable significant reductions to the network complexities of operator, hyperscalers, and third party developers to be able to write applications directly to the underlying access technologies. Such capabilities are, for example, particularly valuable with respect to the rapidly-growing IoT industry, as well as the broader Internet ecosystem that are presently experiencing significant proliferation of IoT endpoints.

The following exemplary use cases are provided for purposes of illustration, and are not intended to be limiting. These illustrative cases describe only some of the many examples in which implementation of a NEL within the NaaP paradigm may advantageously provide a more secure and easy-to-use experience for both networks and network users.

Network Aware Discovery and Deployment Use Cases

Figure 3A:
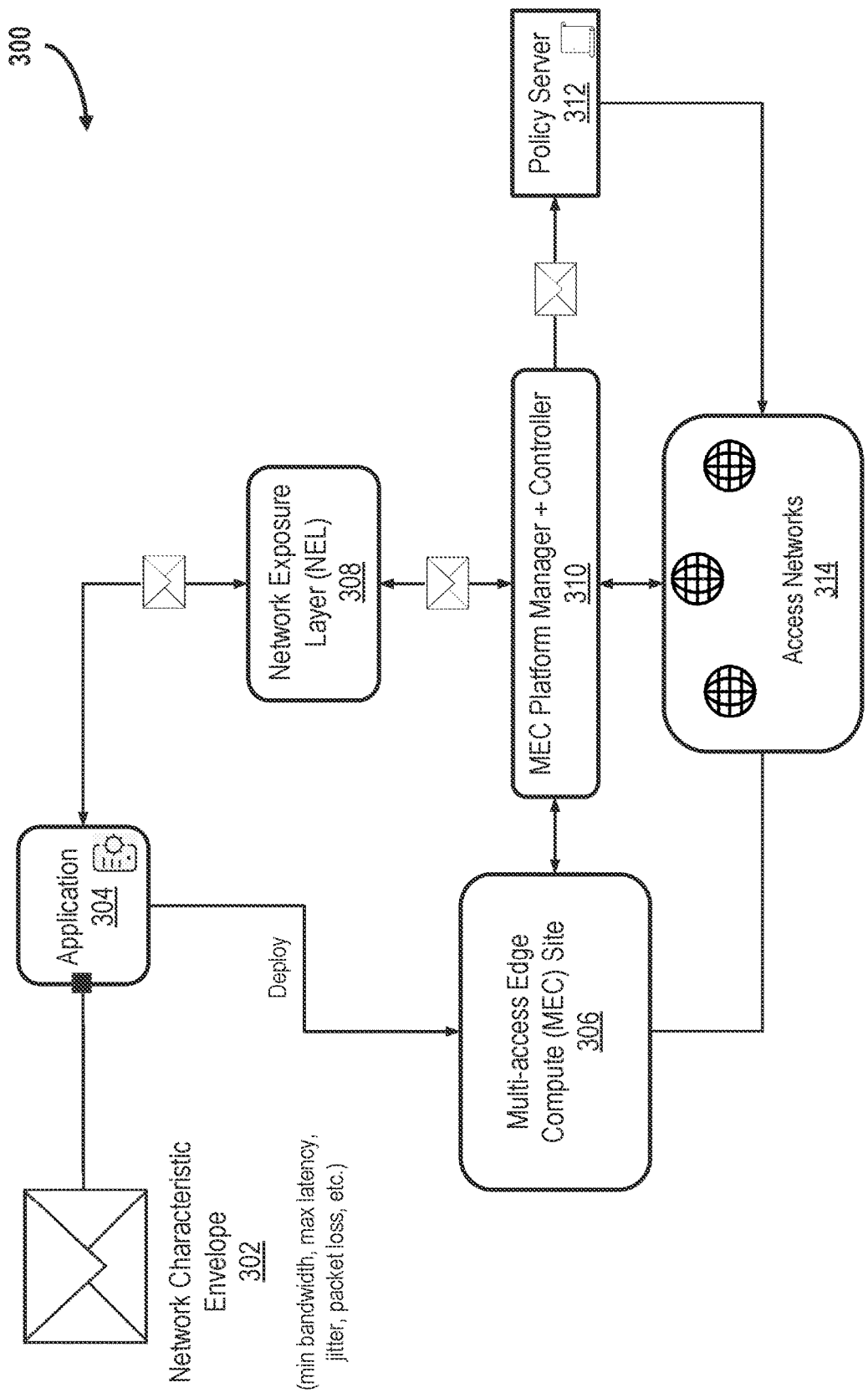
FIG. 3A is a schematic illustration depicting an exemplary system for utilizing a network characteristic envelope, in an embodiment.

FIG. 3A is a schematic illustration depicting an exemplary system 300 for utilizing a network characteristic envelope 302. In the exemplary embodiment depicted in FIG. 3A, the network characteristic envelope 302 is provided for an application 304 being deployed with respect to an MEC site 306. In this example, application 304 may utilize the network characteristic envelope 302 to communicate with one or more networks 308, through an NEL 310, regarding network characteristics that may be required or desired for optimal application performance, including without limitation one or more of minimum bandwidth, maximum latency, jitter, and packet loss. The person of ordinary skill in the art though, will understand that these particular metrics and network characteristics are provided by way of example, and not in a limiting sense. Fewer or other metrics and/or network characteristics may be included in network characteristic envelope 302 without departing from the scope herein.

In an exemplary embodiment, system 300 may further include an MEC platform manager/controller 312 disposed between MEC site 306 and NEL 310. MEC platform manager/controller 312 may then be advantageously configured to forward network characteristic envelope 302 to a policy server 314 in communication with one or more of networks 308. Using this unique network characteristic envelope 302, networks 308 are advantageously enabled to communicate back and forth with application 304, i.e., two-way communication, regarding both real and virtual network capabilities. For example, based on telemetry and/or other meaningful static and dynamic network characteristics and functionalities, implementation of the present network characteristic envelope 302 may enable two-way communication regarding whether a particular network capability has been instantiated, or may not be presently instantiated. For ease of explanation, individual APIs of NEL 310 are not shown in FIG. 3A.

Figure 3B:
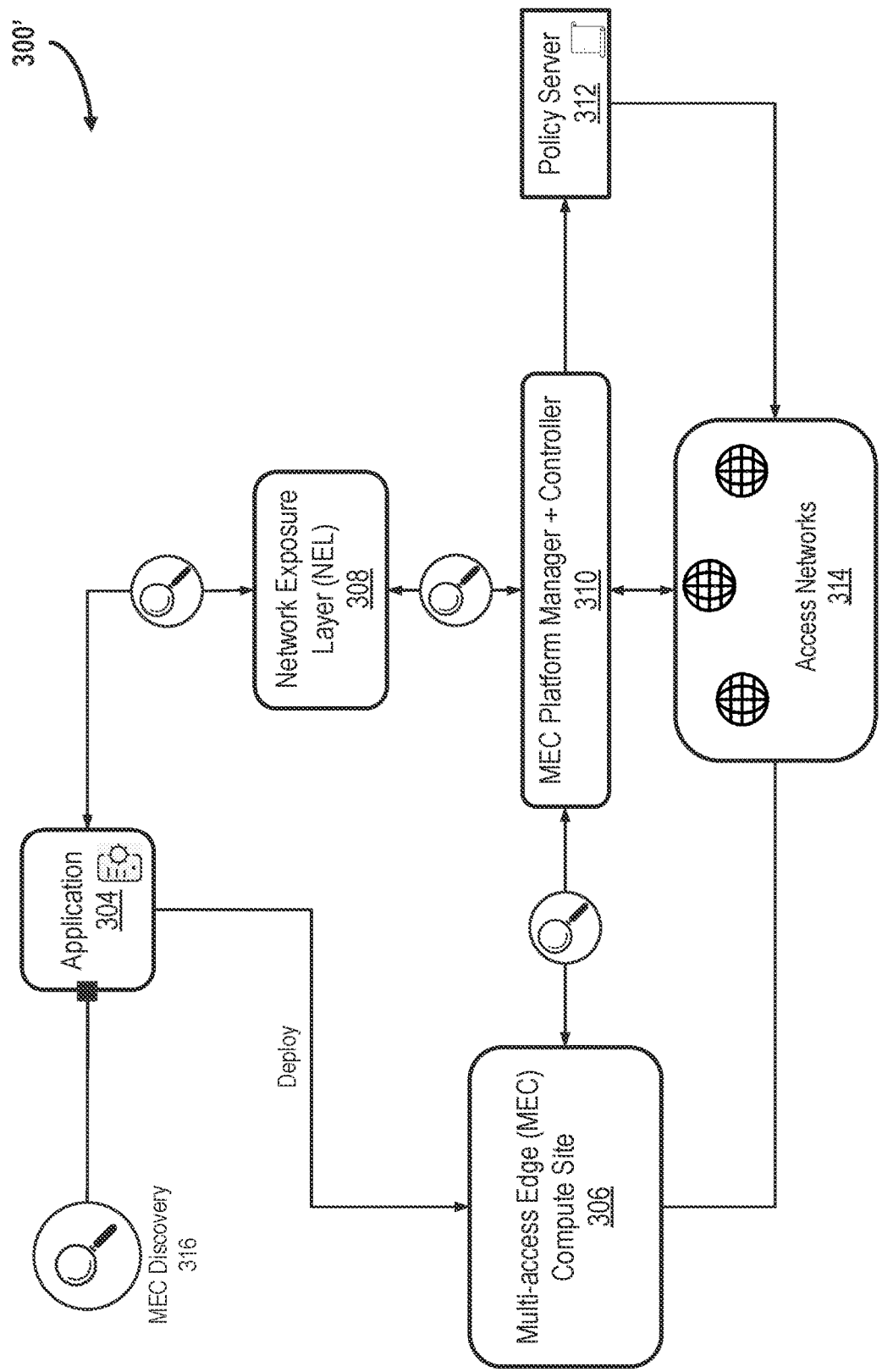
FIG. 3B is a schematic illustration depicting an exemplary multi-access edge compute discovery function for the system depicted in FIG. 3A.

FIG. 3B is a schematic illustration depicting an exemplary MEC discovery function 316 for system 300, FIG. 3A. In an exemplary embodiment, once two-way communication between network(s) 308 and application 304 has been established, system 300 may be further advantageously configured to implement MEC discovery function 316 to enable MEC platform manager/controller 312 to discover one or more, alone or in combination, MEC sites 306 that may provide the most optimal performance based on network characteristic envelope 302. That is, in an embodiment, once a particular MEC site 306 has been established, MEC platform manager/controller 312 may send network characteristic envelope 302 to policy server 314 to ensure that the performance metrics established in network characteristic envelope 302 are being met while application 304 is in use.

Figure 4:
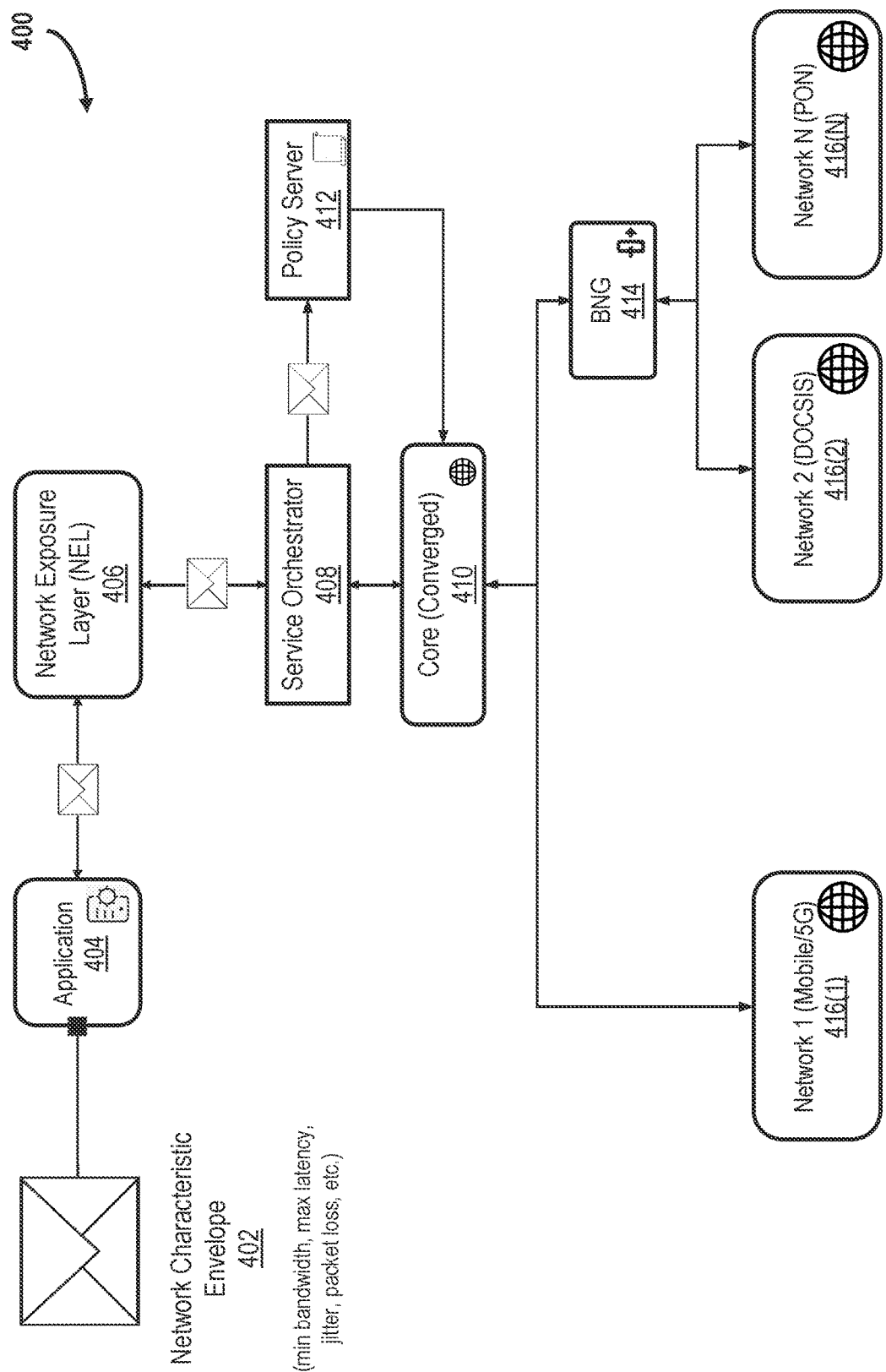
FIG. 4 is a schematic illustration depicting an alternative system for utilizing a network characteristic envelope, in an embodiment.

FIG. 4 is a schematic illustration depicting an alternative system 400 for utilizing a network characteristic envelope 402. In the exemplary embodiment depicted in FIG. 4, network characteristic envelope 402 is similar to network characteristic envelope 302, FIG. 3A, and is also provided for an application 404 communicating through an NEL 406 (i.e., through one or more federated APIs thereof, not individually depicted in FIG. 4). Other elements herein having similar labels to elements of other embodiments may be considered to have similar structure, operation, and/or functionality.

In exemplary operation of system 400, when application 404 is online, network characteristic envelope 402 may make a call to NEL 406 through at least one API with particular network metrics and/or characteristics particular to optimal use of application 404. For example, in the case where application 404 may not be latency-sensitive, network characteristic envelope 402 may not include latency-related characteristics or metrics.

In further exemplary operation of system 400, once network characteristic envelope 402 is received, NEL 406 may be further configured to push the call through to a service orchestrator 408. Service orchestrator 408 may then call a converged core (not separately shown) of system 400, by way of a 5G core 410, with the required network characteristics of application 404. In an embodiment, service orchestrator 408 may be further configured to forward network characteristic envelope 402 to a policy server 412 in communication with 5G core 410. 5G Core may then determine which of a plurality of access networks 414 (e.g., mobile, 5G, DOCSIS, PON, etc.) is suited, or best suited, to meet the needs of application 404, as communicated through network characteristic envelope 402. Through this exemplary implementation of network characteristic envelope 402, system 400 is advantageously enabled to more easily perform optimized access network discovery for application 404.

In an embodiment, system 400 may further include a broadband network gateway (BNG) 416 disposed between 5G core 410 and DOCSIS networks and/or PONs (e.g., DOCSIS network 414(2) and PON 414(N), in the example depicted in FIG. 4), and through which 5G core 410 may communicate to understand congestion on the respective networks 414 connected thereto, as well as whether a wireless or wireline network may create a more optimal experience for execution of application 404 according to the information provided by network characteristic envelope 402.

In at least one embodiment, during the runtime of application 404, policy server 412 may be configured to monitor the performance of a particular access network 414 to verify that the specified network characteristics of network characteristic envelope 402 are being met. In the case where degradation occurs during the runtime, policy server 412 may be further configured to execute a push back to 5G core 410 to determine an alternative access network 414 that would continue optimal performance application 404 according to network characteristic envelope for up to. In this scenario, in the event that no suitable alternate path is found to be available for application 404 to make changes to its runtime, 5G core 410 may be further configured to also make a call back to application 404, e.g., through service orchestrator 408 and NEL 406.

Automatic NaaP Delivery of Differentiated Services

There is also a desire in the industry to enable the delivery of differentiated services, and particularly business-class services (e.g., from corporate-level networks) for remote connectivity, such as in the case of remote work, or work-from-home (WFH), scenarios. At present, many employees utilize connective business equipment (e.g., corporate computers, smartphones, IoT accessories, etc.) outside of the confines of an office environment, which environment typically includes significantly higher network security than is available to the average remote or home network environment. Moreover, when employees connect such corporate devices remotely, significant interaction is typically required by the device user and/or information technology (IT) support staff to set up the device, as well as relevant applications on the device. Thus, there is a particular need to enable secure, automatic device/application setup without further user interaction. As described below with respect to FIG. 5, these particular challenges and industry needs are addressed and solved utilizing the innovative NaaP/NEL embodiments described herein.

Figure 5:
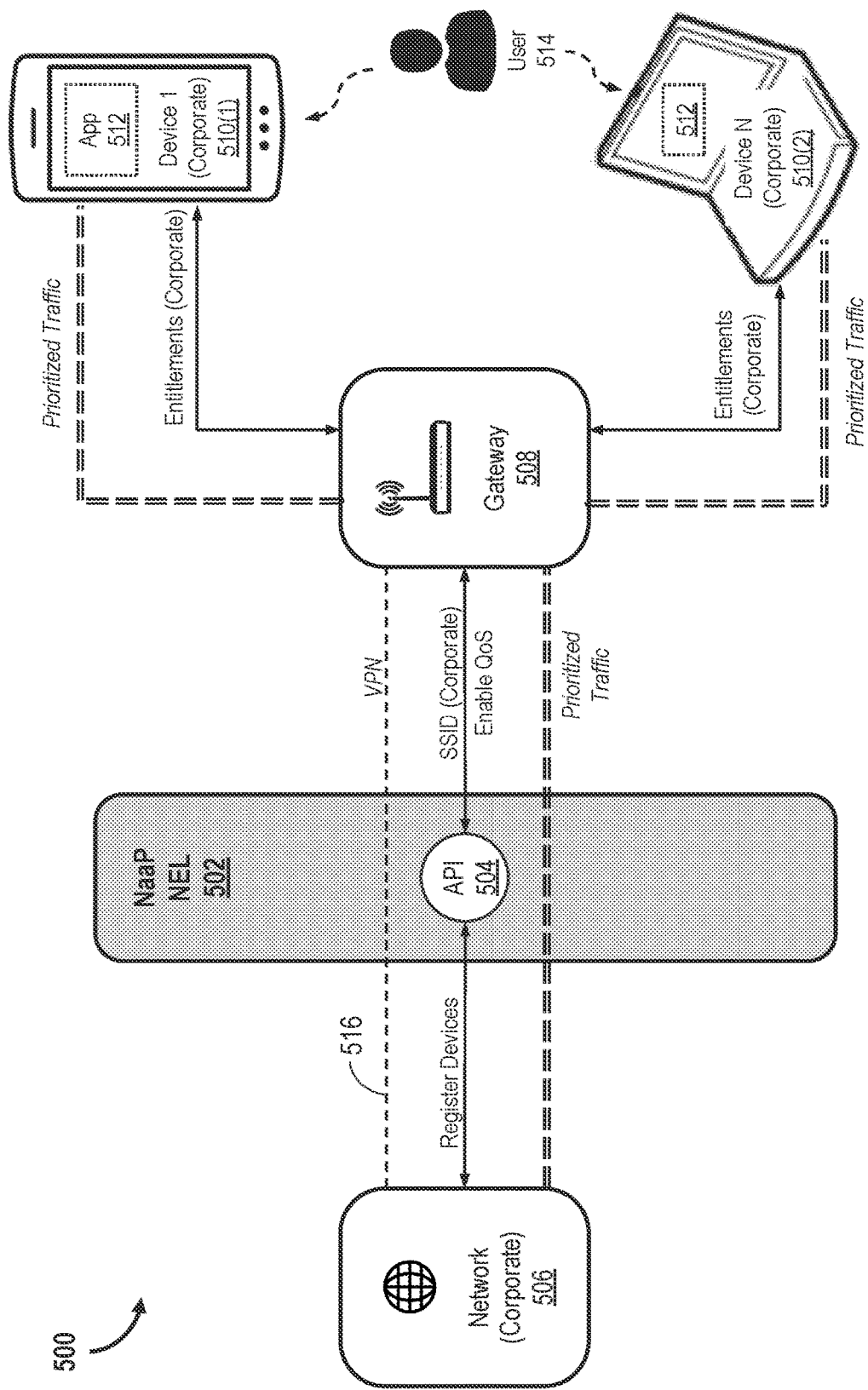
FIG. 5 is a schematic illustration depicting an exemplary system for automatic delivery of differentiated services, in an embodiment.

FIG. 5 is a schematic illustration depicting an exemplary system 500 for automatic delivery of differentiated services. In the exemplary embodiment depicted in FIG. 5, system 500 implements a NaaP NEL 502, including a set of federated APIs (e.g., distributed), including at least one API 504 through which a primary network 506 interacts with system 500. In the exemplary embodiment, system 500 further includes a user gateway 508 enabling connection of one or more wired or wireless communication devices 512 (e.g., smartphone, laptop, etc.), and API 504 is standardized to be universally accessible to both primary network 506 and user gateway 508. According to this embodiment, a user (i.e., the connective electronic devices thereof) operating according to the limits of the user's own home network is now advantageously enabled to utilize the some or all of the resources and services of primary network 506 through the distributed NaaP/NEL 502.

More specifically to the example depicted in FIG. 5, primary network 506 is illustrated as a corporate network, and user devices 510 are illustrative of corporate-issued devices to a user-employee such that the employee-user may operate the respective devices 510 through gateway 508, which may or may not be part of the user's own home network (not separately shown in FIG. 5), but using the resources and capabilities of primary network 506 enabled by API 504. Devices 510 may, for example, be further configured to contain a downloaded application 512 provided by primary network 506, or a separate operator network (not shown in FIG. 5) to which operator network subscribes. In some cases, API 504 may serve as a pass-through interface enabling a device 510 full access to network 506. In other cases, API 504 may provide differentiated services, levels of access, vision capability, and/or resources into primary network 506.

In an exemplary operation of system 500, a user 514 connects (e.g., wirelessly and/or by a wireline) a corporate device 510 to remote gateway 508 (e.g., of a home network). Gateway 508, similar to the functionality of gateway 224, FIG. 2, may then call API 504 (e.g., a device management API) of NaaP NEL 502, which in turn may push the call to primary network 506 to register the connected device 510 or, in the case where the connected device 510 has already been registered as belonging to the corporate WFH service of primary network 506, enable a secure tunnel (e.g., a VPN, GRE tunnel, etc.) 516 between gateway 508 and primary network 506 (e.g., a corporate intranet thereof). Utilizing NaaP NEL 502, device detection, setup of a dedicated network including a corporate SSID, activation of corporate quality of service (QoS), and the secure tunnel may all be enabled automatically.

According to the exemplary embodiment depicted in FIG. 5, devices 510 may be automatically detected and provided with device-based entitlements. Additionally, the dedicated SSID may be dynamically configured on gateway 508, and business-class QoS (e.g., including prioritized traffic) may be provisioned and dynamically assigned (e.g., based on the particular corporate service), and all without requiring any interaction or setup by user 514 or application 512 on the respective device 510. In an embodiment, additional security for system 500 may be achieved through one or more VPN solutions, including one-time-passcode (OTP) VPN. Additionally, one or more device applications may be configured to prioritize particular types of traffic.

According to system 500, differentiated business-class services may be automatically provided to one more devices 500 in a WFH or remote work scenario without requiring any additional device user or application interaction or setup. According to this example, network operators may advantageously benefit from being able to offer differentiated services from one or more specialized networks to individual users that may or may not be subscribers to a particular network, and device users may advantageously benefit by the increased menu of additional and/or improved services now available to that device through the NEL menu of services provided from any operator network location subscribed to NaaP NEL 502. The person of ordinary skill in the art will thus understand that system 500 is not limited to the home use paradigm, and that the principles herein are fully applicable to distributed interaction between devices any subscribed network operator.

NaaP Implementation on a Global Platform

Figure 6:
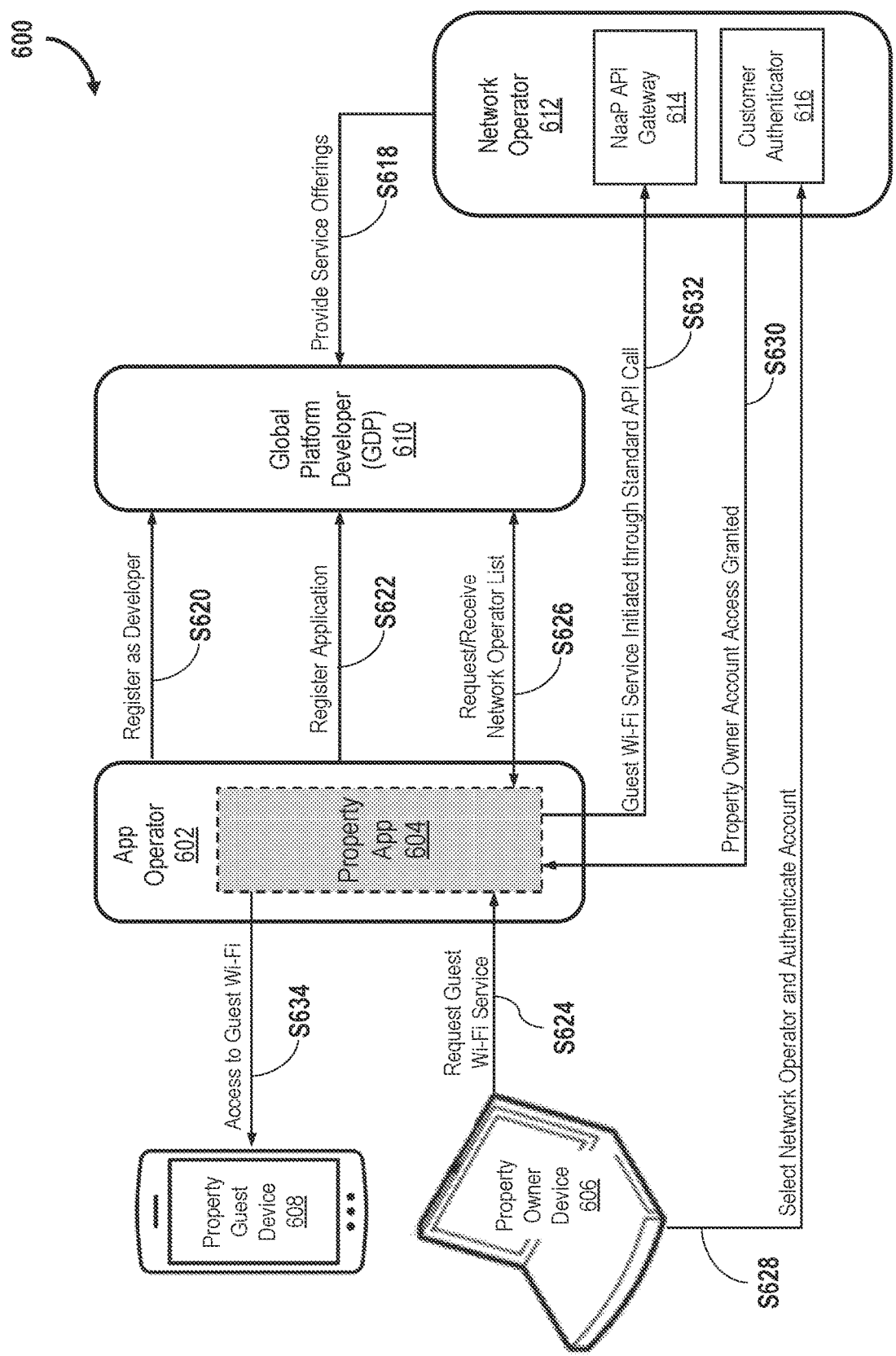
FIG. 6 is a schematic illustration depicting an exemplary network-as-a-platform implementation process, in an embodiment.

FIG. 6 is a schematic illustration depicting an exemplary NaaP implementation process 600. Process 600 may be implemented, for example, with respect to logical architecture 100, FIG. 1, and/or architecture 200, FIG. 2, and with respect to one or more elements thereof, as well as more or fewer elements not specifically illustrated in FIG. 6, and further may implement one or more of the call/push functions therein to execute one or more of the following steps. In this example, process 600 is described with respect to a property rental scenario for an application operator 602 managing a property rental application 604 utilized by a property owner through a property owner device 606. In this scenario, the property owner seeks to provide a property guest device 608 automated access to network services at the property location, such as guest Wi-Fi access.

In this scenario, process 600 is further executed with respect to a global platform developer (GDP) 610 in operable communication with application operator 602, as well as a network operator 612 in operable communication with GDP 610 and property owner device 606. That is, according to this scenario, upon selection by property owner device 606, network services (e.g., Internet, Wi-Fi, etc.) at the property location may be provided by network operator 612. Network operator 612 may further include at least a NaaP-accessible API gateway 614 and a customer authentication module 616.

Unless otherwise described to the contrary, some or all of the following steps of process 600 may be performed simultaneously, or in a different order. In some embodiments, more or fewer steps may be performed without departing from the scope herein.

In operation, process 600 begins at step S618, in which network operator 612 provides (e.g., through an NEL, not separately shown in FIG. 6) a menu of service offerings to GDP 610. In step S620, application operator 602 registers as a developer with GDP 620, and then in step S622, registers application 604 with GDP 610. The person of ordinary skill in the art will understand that step S618 may be executed prior to, during, or after the execution of steps S620 and S622.

In step S624, property owner device 606 requests services from application 604. In step S626, application 604 requests and receives from GDP 610 a list of network operators, which includes network operator 612. In step S628, property owner device 606 selects network operator 612 and authenticates the account of the property owner with customer authentication module 616. In step S630, customer authentication module 616 notifies application 604 to grant access for the property owner account. In step S632, application 604 initiates the requested guest service(s) with API gateway 614. In an exemplary embodiment of step S632, the requested guest service(s) may be initiated through a standard API call. In an exemplary embodiment, steps S626, S628, S630, and/or S632 may utilize some or all of the network discovery principles described above with respect to FIGS. 3A-B and 4. In step S634, guest device 608 is seamlessly granted access to the requested services without any required intervention by the user of guest device 608.

The person of ordinary skill in the art will understand that process 600 is illustrated and described by way of example, and is not intended to be limiting. Utilization of the NaaP and NEL of the present embodiments advantageously enables a variety of additional or different use cases that will provide individual users or networks visibility into other networks and access to differentiated services thereof through the NEL. The person of ordinary skill in the art will further understand that utilization of GDP 610 is therefore optional, and that network discovery and NEL subscription may be accomplished through other mechanisms or entities.

According to the embodiments herein, some or all of the resources that are typically confined to one network may now be seamlessly provided through the NaaP and NEL to home networks or remote users, but without the typical complexity and user interaction required for such use. The recent proliferation of connected devices in homes and small businesses has rendered it necessary for the home network to have advanced capabilities that were only conventionally available to large enterprises and networks. Thus, for modern and future networks to be viable in the home or small business environmental setting, it is becoming more necessary that remote users of such networks may automatically utilize those network resources. The present NaaP systems and methods enable this advanced and automatic delivery of differentiated resources from multiple networks.

In just the last several years, with the increasing prevalence and adoption of IoT devices, home networks are seeing significantly greater numbers of devices connecting to the networks. A typical home network includes a cable operator-provided modem or gateway, an integrated or standalone 802.11 Wi-Fi router or access point, and often several ethernet-connected devices. In most home networks, the traffic from all connected devices (e.g., IoT devices, personal computers, smart phones, tablets, etc.) transits a single network enabled by a residential or small office/home office (SOHO) gateway. This type of single, flat network architecture has heretofore been ill suited to the rapidly evolving nature of the use of these networks. The present NaaP embodiments overcome this challenge by effectively distributing the delivery of various services from potentially multiple networks through the logical and distributed physical NaaP architecture.

As described above, the several exemplary NaaP architectures and use cases described herein are particularly useful for network operators, partners, and service providers to subscribe to the NEL to provision and deliver specific services requested by, or prescribed for, a user device, an application, and/or another network. The solutions provided herein realize still further advantages within the paradigm of emerging artificial intelligence assistants (e.g., Alexa, Google, etc.) by reducing the need to configure manual logins for connected devices. The present systems and methods are of particular applicability to the needs of remote users of different networks, by providing a significantly more secure delivery of differentiated services.

Exemplary embodiments of systems and methods for a distributed network-as-a-platform and federated network exposure layer are described above in detail. The systems and methods of this disclosure though, are not limited to only the specific embodiments described herein, but rather, the components and/or steps of their implementation may be utilized independently and separately from other components and/or steps described herein.

In the exemplary embodiments described herein, one or more software applications may be provided that implement computer-executable instructions and/or logic that, when executed by one or more processors of a device, server, network, or system, accomplish the processes and subprocesses described herein. In some embodiments, a software application is stored and executed within a processor or communication unit of a device. In other embodiments, such applications may be external to, and remotely accessible by, a connected device. In some embodiments, the one or more applications may be implemented by an operator to enable uniform operation of algorithms across different platforms, or may be distributed across a federated networking ecosystem of operators, users, and/or applications. As used herein, the term "application" may refer to a software application, or a suite of software applications, installed on one or more processors, that is/are configured to execute any or all of the processes, subprocesses, methods, and/or algorithms described herein. Except where specifically described to the contrary, any functional steps may be executed individually, separately, or in a different order from other functional steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

The present embodiments are described below with respect to several components of a conventional access, DOCSIS, PON (e.g., GPON, CPON, EPON, etc.) and/or wireless/Wi-Fi networks, some or all of which may include optical and/or cable networking hardware and software within the scope of the present embodiments. Such optical networking components may include, without limitation, an Optical Network Terminal (ONT), an Optical Line Termination (OLT), and an Optical Network Unit (ONU), and may utilize optical protocols such as EPON, RFOG, or GPON. Other types of communication systems our further contemplated, including communication systems capable of x-hauling traffic, satellite operator communication systems, MIMO communication systems, microwave communication systems, short and long haul coherent optic systems, etc. X-hauling is defined herein as any one of or a combination of front-hauling, backhauling, and mid-hauling.

In some embodiments, operators may communicate with other entities through one or more communication devices, including without limitation, a termination unit such as an ONT, an OLT, a Network Termination Unit, a Satellite Termination Unit, a Cable Modem Termination Systems (CMTS), or other termination systems collectively referred to herein as "Modem Termination Systems (MTS)." Similarly, gateways or other devices may communicate using a modem device, including without limitation, a cable modem (CM), a satellite modem, an ONU, a DSL unit, etc., which are collectively referred to herein as "modems." Furthermore, the DOCSIS protocol may be substituted with, or further include protocols such as EPON, RFoG, GPON, Satellite Internet Protocol, without departing from the scope of the embodiments herein.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A network-as-a-platform (NaaP) ecosystem, comprising:
    a network exposure layer (NEL) comprising a plurality of federated application programming interfaces (APIs) including at least a first federated API and a second federated API different from the first federated API;
    a first electronic communication network in operable communication with the NaaP ecosystem through the first federated API of the NEL;

a second electronic communication network, different from the first electronic communication network, in operable communication with the NaaP ecosystem through the second federated API of the NEL; and a virtual service layer logically disposed between (a) the NEL, and (b) the first and second electronic communication networks, wherein the NEL enables the second network access to and functionality of at least one functional capability of the first electronic communication network for an external electronic communication device in operable communication with a physical infrastructure of the second electronic communication network.

2. The ecosystem of claim 1, wherein the first electronic communication network includes at least one of an access network, a mobile network, a passive optical network (PON), a coherent PON (CPON), an Ethernet PON (EPON), a gigabit PON (GPON), a 3GPP-based network, a 5G network, a data over cable service interface specification (DOCSIS) network, a low earth orbit (LEO) network, and a very LEO (VLEO) network.

3. The ecosystem of claim 1, wherein the plurality of federated APIs includes at least one of a core network function API, an operations API, an intent-based API, an edge application mobility API, and a device management API.

4. The ecosystem of claim 1, wherein the virtual service layer includes at least one of a device controller, a network telemetry and topology server, a configuration and profile management server, a network service orchestrator (NSO), a subscriber and policy database, and an authentication, authorization, and accounting (AAA) server.

5. The ecosystem of claim 1, further comprising a management and control layer logically disposed between (a) the virtual service layer, and (b) the first and second electronic communication networks.

6. The ecosystem of claim 5, wherein the management and control layer is configured for software defined networking (SDN).

7. A network-as-a-platform (NaaP) ecosystem, comprising:

a network exposure layer (NEL) comprising a plurality of federated application programming interfaces (APIs) including at least a first federated API and a second federated API different from the first federated API;

a first electronic communication network in operable communication with the NaaP ecosystem through the first federated API of the NEL;

a second electronic communication network, different from the first electronic communication network, in operable communication with the NaaP ecosystem through the second federated API of the NEL; and a multi-access edge compute (MEC) site configured to deploy an external application to run on at least one of the first and second electronic communication networks, wherein the NEL enables the second electronic communication network access to at least one capability of the first electronic communication network for an external electronic communication device in operable communication with a physical infrastructure of the second electronic communication network.

8. The ecosystem of claim 7, wherein the MEC site is further configured to select the first electronic communication network to run the external application based on a network characteristic envelope included with the external application.

9. The ecosystem of claim 8, wherein the network characteristic envelope includes at least one desired performance metric for the external application to run on the first electronic communication network.

10. The ecosystem of claim 9, wherein an external electronic communication device in operable communication with the second electronic communication network is enabled to access the external application utilizing the at least one desired performance metric of the first electronic communication network.

11. The ecosystem of claim 9, wherein the at least one desired performance metric of the first electronic communication network specifies at least one of a desired bandwidth, maximum latency, jitter, speed, ultra low latency (ULL), device management, remote capability, Wi-Fi services, and packet loss.

12. The ecosystem of claim 8, wherein the external application originates from the second electronic communication network.

13. The ecosystem of claim 8, wherein the MEC site is further configured to discover at least one different MEC site to provide optimal performance of the external application based on the network characteristic envelope.

14. The ecosystem of claim 7, further comprising a converged core disposed between (a) the MEC site, and (b) the first and second electronic communication networks.

15. The ecosystem of claim 7, wherein the NEL is further configured to register the external application through a global platform developer (GDP).

16. A central controller for a network-as-a-platform (NaaP)-based electronic communication ecosystem, comprising:

a network exposure layer (NEL) comprising a plurality of federated application programming interfaces (APIs) including at least a first federated API and a second federated API different from the first federated API;

a processor; and a memory in communication with the processor and the NEL, and configured to store computer-executable instructions therein, which, when executed by the processor, cause the processor to:

subscribe a first network to the NEL through the first federated API;

enable a second network, different from and separately operated from the first network, to subscribe to the NEL through the second federated API; and deploy an application originating from the second network to run on the first network based on at least one performance characteristic of the first network visible to the second network through the NEL.

17. The central controller of claim 16, wherein the memory is further configured to store a catalog of services and/or resources of the first network available to the second network.

18. The central controller of claim 17, wherein the instructions further cause the processor to enable the second network to view at least some of the services and/or resources available from the first network.

19. The central controller of claim 18, wherein the instructions further cause the processor to prevent the second network from viewing or accessing at least one of the services and/or resources available from the first network.

* * * * *